Sept. 8, 1964 D. H. GARRIOTT ETAL 3,147,780
MACHINE FOR LOADING PARTICULATE MATERIAL IN CONTAINERS
Filed Dec. 4, 1962 4 Sheets-Sheet 1
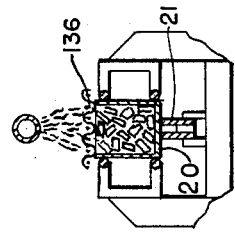
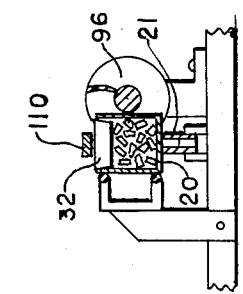
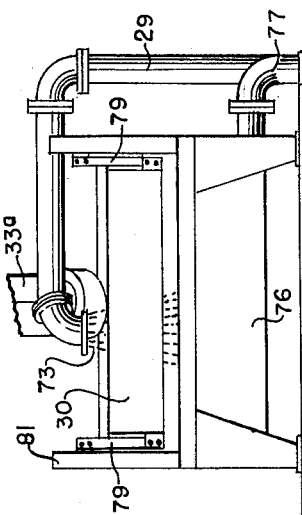
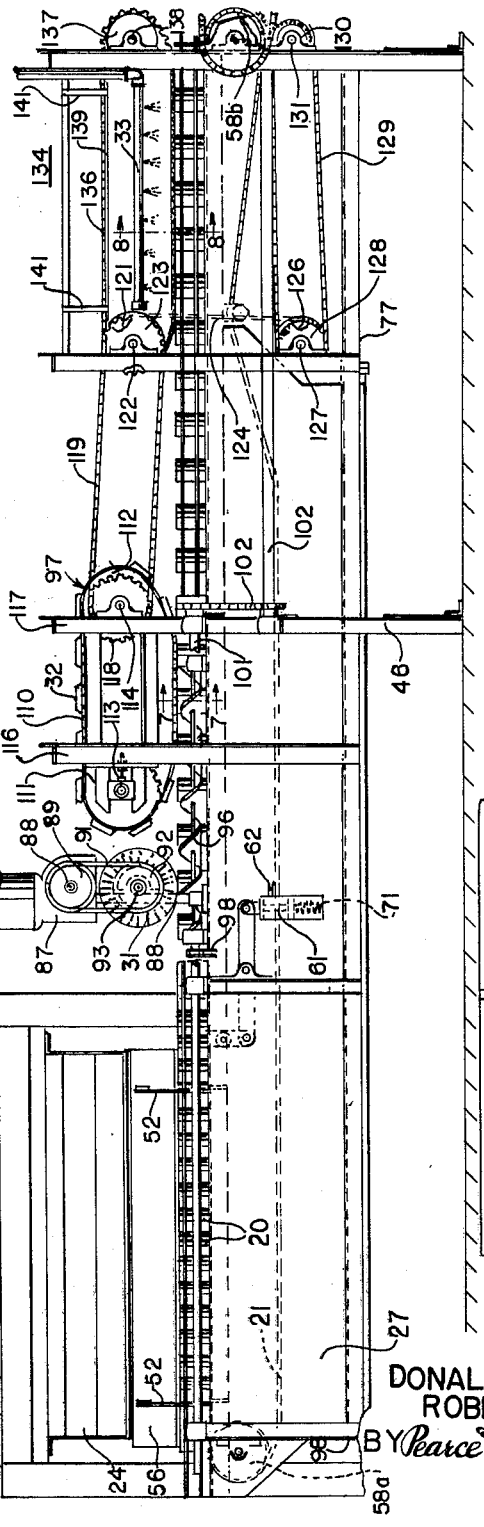
INVENTOR.
DONALD H. GARRIOTT
ROBERT L. HILL
BY Pearce & Schaeperklaus
Attorneys

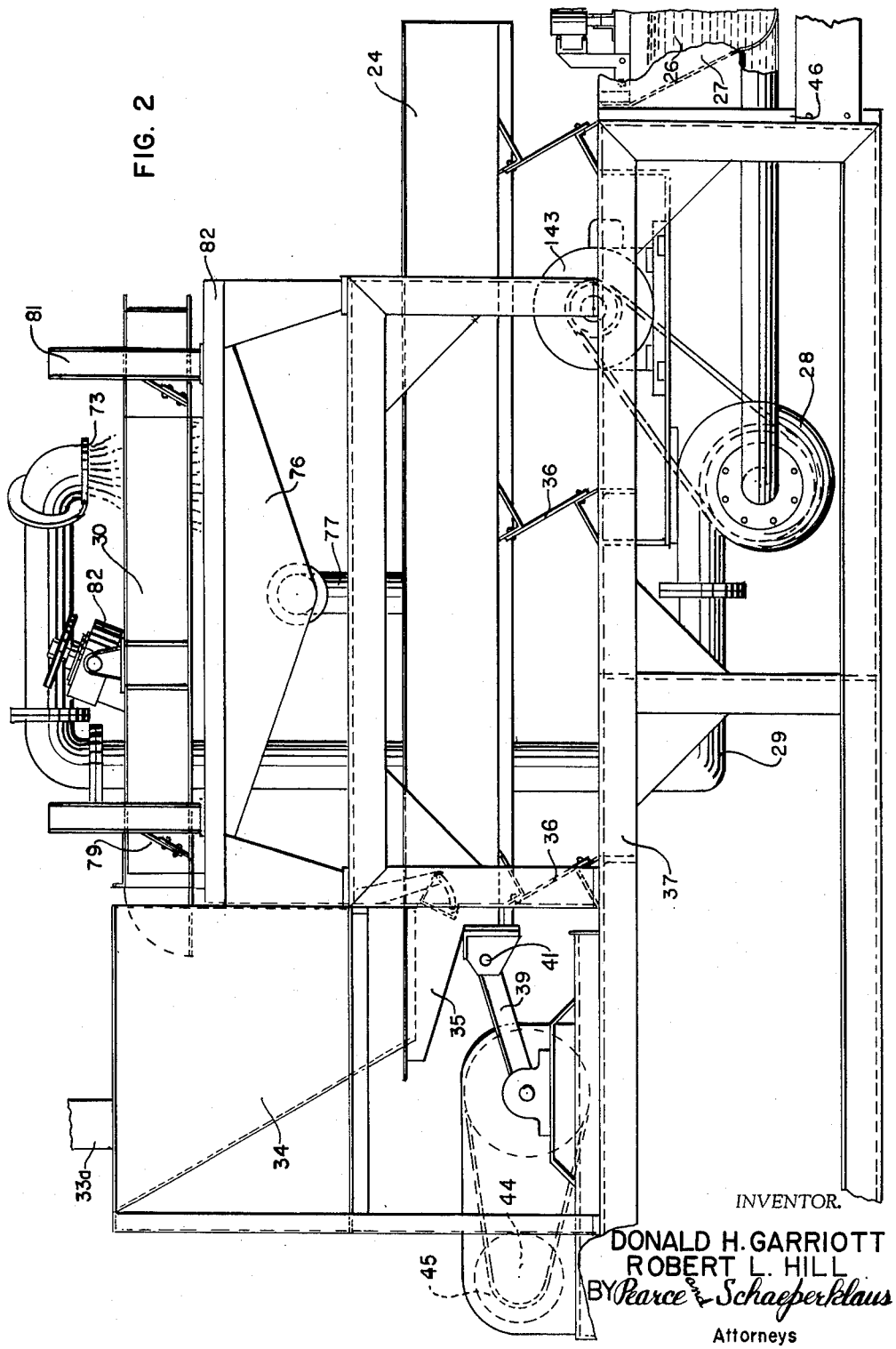

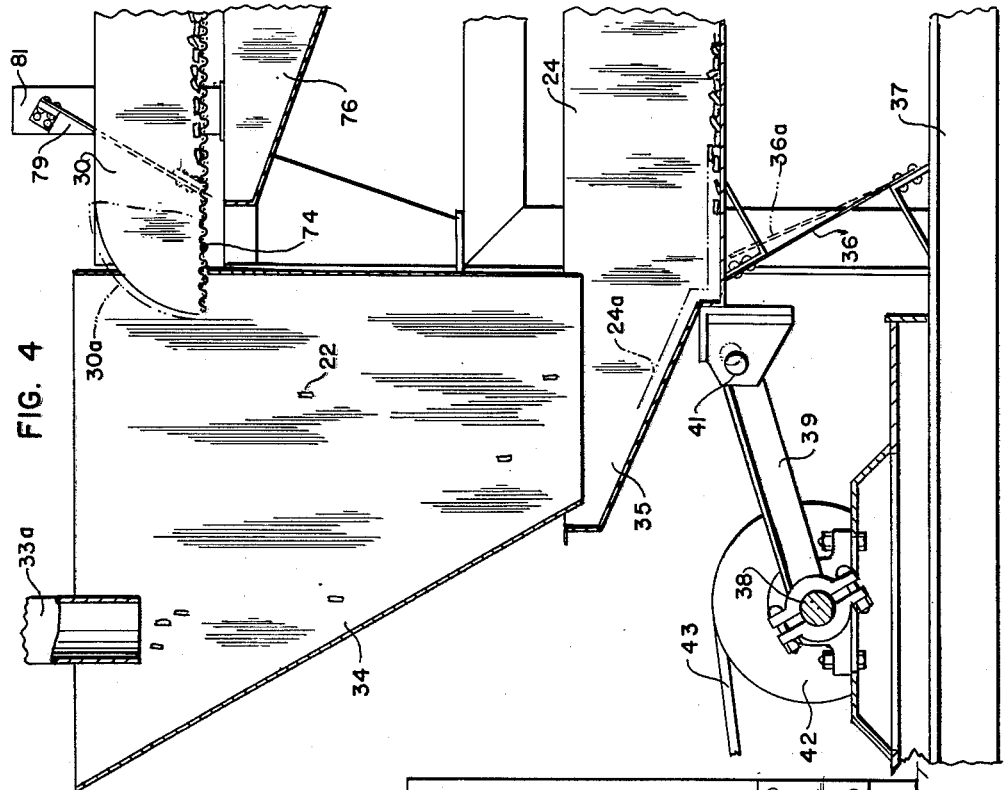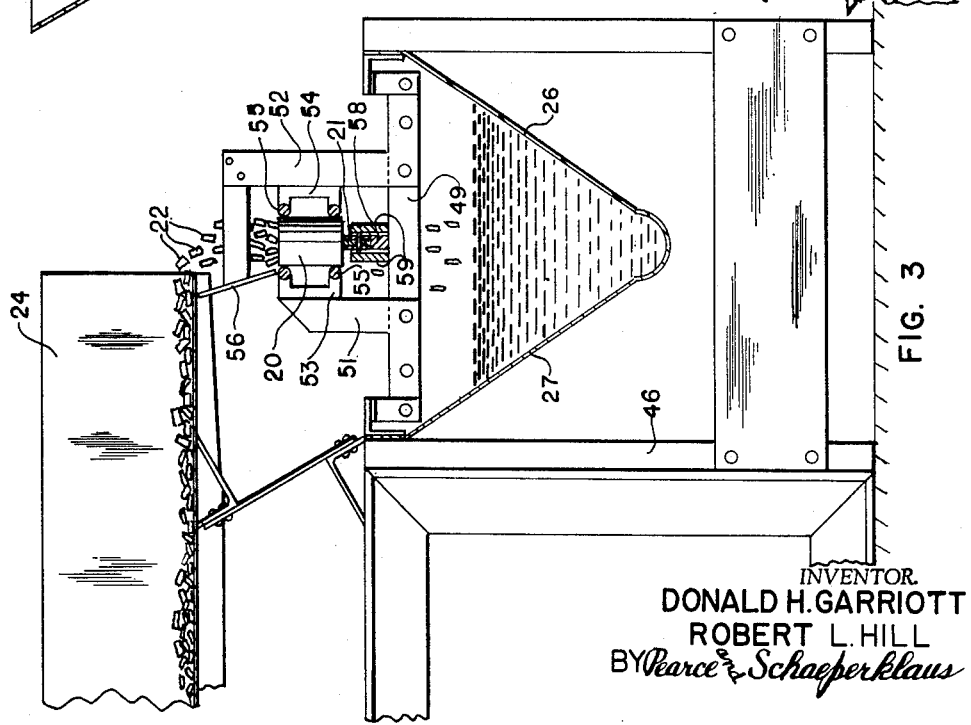

Sept. 8, 1964  D. H. GARRIOTT ETAL  3,147,780
MACHINE FOR LOADING PARTICULATE MATERIAL IN CONTAINERS
Filed Dec. 4, 1962  4 Sheets-Sheet 4
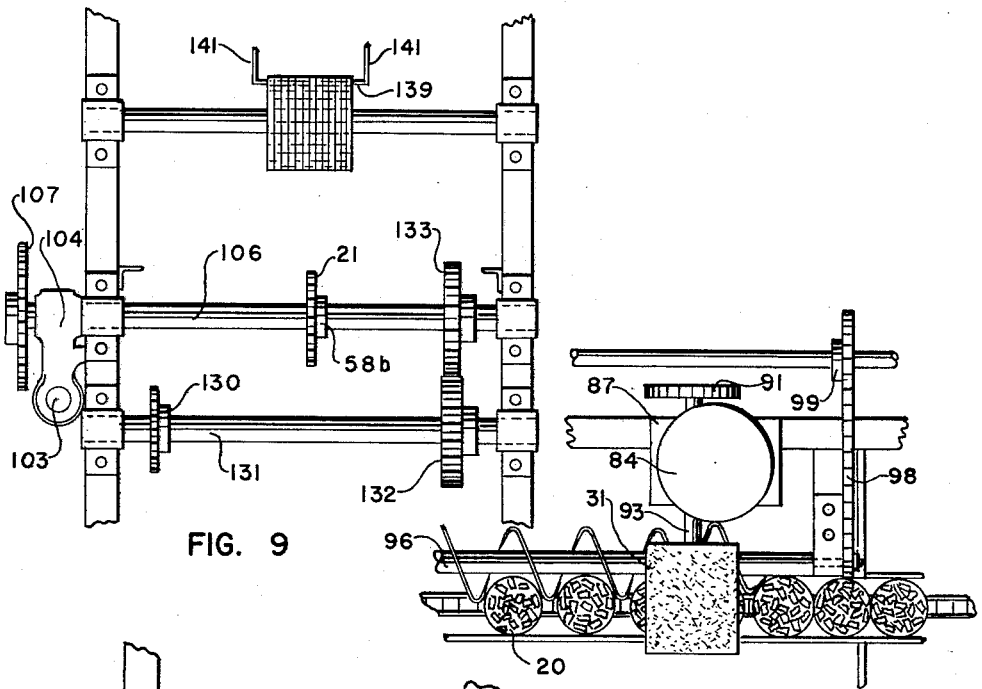
FIG. 9
FIG. 6
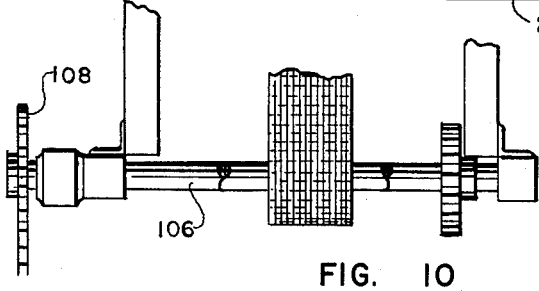
FIG. 10
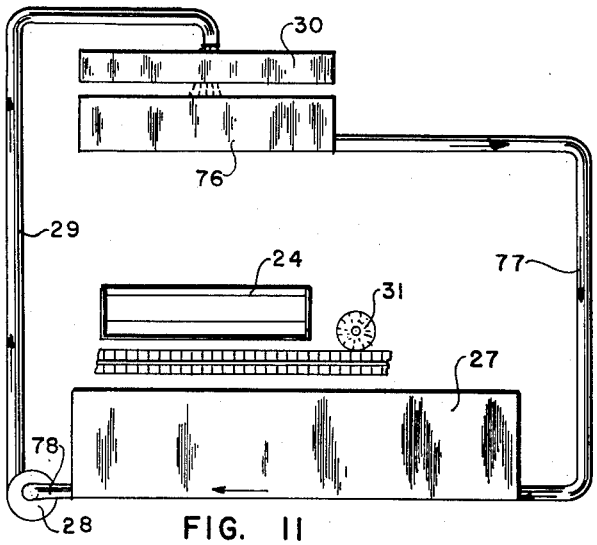
FIG. 11
INVENTOR.
DONALD H. GARRIOTT
ROBERT L. HILL
BY Pearce & Schaeperklaus
Attorneys United States Patent Office 3,147,780
Patented Sept. 8, 1964

3,147,780
MACHINE FOR LOADING PARTICULATE
MATERIAL IN CONTAINERS
Donald H. Garriott, Scottsburg, and Robert L. Hill, Austin, Ind., assignors to Morgan Packing Company, Inc., Austin, Ind., a corporation of Indiana
Filed Dec. 4, 1962, Ser. No. 242,243
7 Claims. (Cl. 141—88)

This invention relates to a machine for loading particulate produce such as beans or the like into containers.

An object of this invention is to provide a machine which pours or loads beans or the like into the containers and in which excess beans or the like are caught in a trough beneath the containers for recycling.

A further object of this invention is to provide a machine of this type in which excess beans or the like fall into liquid in the trough, and the liquid is circulated through a strainer which removes the beans or the like from the water to be recycled to the containers.

A further object of this invention is to provide a machine of this type in which excess beans received in the containers are swept or brushed off of the tops of the containers into a liquid in the trough.

A further object of this invention is to provide a machine of this type in which, after the excess beans or the like have been swept off the tops of the containers, a plug is introduced into the upper portion of each container to compress the beans or the like inside the can.

A further object of this invention is to provide a machine of this type in which, after the contents of the can have been compressed, a section of a heavy, flexible openwork belt is laid on the top of each container and liquid is introduced into the containers through the open-work belt to fill the containers, the belt holding the beans or the like inside the containers.

The above and other objects and features of the invention will be apparent to those skilled in the art to which this invention pertains from the following detailed description, and the drawings, in which:

FIG. 1 is a view in front elevation of a container loading machine constructed in accordance with an embodiment of this invention, a portion of a drive shaft thereof being broken away to reveal interior structure;

FIG. 2 is a view in side elevation of the machine illustrated in FIG. 1, portions being broken away to reveal details of construction;

FIG. 3 is an enlarged fragmentary view in transverse section showing details of container-loading mechanism of the machine;

FIG. 4 is an enlarged fragmentary view in transverse section showing apparatus for introducing particulate food products into container-loading mechanism;

FIG. 5 is an enlarged fragmentary view partly in front elevation and partly in section showing a container agitating mechanism in raised position;

FIG. 6 is an enlarged fragmentary plan view showing details of a brush and container advancing mechanism;

FIG. 7 is an enlarged fragmentary view in transverse section taken on a line 7—7 in FIG. 1;

FIG. 8 is an enlarged fragmentary view in transverse section taken on the line 8—8 in FIG. 1;

FIG. 9 is an enlarged fragmentary view in end elevation showing drive connections of the device;

FIG. 10 is an enlarged fragmentary plan view partly in section of the drive connections; and FIG. 11 is a schematic flow view of the device.

In the following detailed description and the drawings, like reference characters indicate like parts.

In FIG. 1 is shown a machine for loading particulate food products such as sections of string beans or the like into open-topped containers 20 as the containers travel along a conveyor chain 21. Beans 22 (FIG. 3) fall from a vibrating loading bin 24 into the containers. Beans which are not caught in the containers fall into water 26 in a trough 27 below the conveyor 21. Water from the trough 27 is pumped by a pump 28 (FIG. 2) through a line 29 to be discharged into a screen-bottomed vibrating tray 30. The water from the tray 30 is recirculated and, as shown in FIG. 4, beans 22 return from the screen-bottomed vibrating tray 30 to the vibrating loading bin 24. As shown in FIG. 1, loaded containers pass under a rotating brush 31 which brushes excess beans from the tops of the containers. The contents of each of the loaded containers are depressed by one of a series of plugs 32. The containers are filled with appropriate liquid from a distributing head 33, and the containers then leave the machine to be closed by appropriate can-closing mechanism (not shown).

The machine which has been described in general terms hereinabove will now be described in greater detail.

The machine is particularly designed for use in loading short lengths of string beans or the like, but the machine can readily be employed in loading other particulate food material and the like. The beans enter the machine through a supply duct 33a (FIGS. 2 and 4) which empties into a hopper 34. From the hopper 34, the beans fall into a loading section 35 of the vibrating loading bin 24. As shown in FIG. 2, the vibrating loading bin 24 is mounted on and supported by resilient plates 36. The plates 36, in turn are mounted on frame members 37. The vibrating loading bin 24 vibrates or swings on the plates 36 between the full line position of FIG. 4 and the position indicated fragmentarily in dot-dash lines at 24a, the position of one of the plates being shown at 36a. The vibrating loading bin 24 is vibrated by a drive which includes a crank shaft 38 and a connecting rod 39 linking the crank shaft 38 and a pivot pin 41 mounted on the under side of the vibrating loading bin 24. The crank shaft carries a pulley 42 driven by a belt 43. The belt 43, in turn, is driven by a pulley 44 (FIG. 2) carried by a motor 45. As the loading bin 24 is vibrated, beans thereon travel to the right as shown in FIGS. 2, 3 and 4 to be discharged into the containers 20 (FIG. 3) on the conveyor chain 21.

As shown in FIG. 3, the machine includes a conveyor frame 46 on which the water trough 27 and cross frames 49 are mounted. On the cross frames 49 are mounted uprights 51 and 52 which carry side guides 53 and 54, respectively. The side guides 53 and 54 carry side rails 55 which steady containers 20 as the containers travel along the conveyor 21. The uprights 52 also carry a baffle plate 56 which guides beans from the vibrating loading bin 24 to the containers. The conveyor 21 is formed as chain which, in turn, is supported by rail sections 58. The conveyor chain 21 runs on sprockets 58a and 58b (FIG. 1) at opposite ends of the conveyor frame 46. The rail sections 58 are mounted in the cross frames 49 and are steadied by side guides 59 attached to the cross frames.

As shown most clearly in FIG. 5 one end of one of the rail sections 58 can be moved up and down by a rail vibrating arrangement shown in FIGS. 1 and 5. The rail vibrating arrangement includes an air cylinder 61. When air is introduced into the air cylinder 61 through a line 62, a crank 63 is swung downwardly from the position shown in FIG. 1 to that shown in FIG. 5 in full lines to swing its shaft 66 and a crank arm 67 raising a link 68. The link 68 pivotally links the crank arm 67 and the rail section 58 so that the rail section 58a is raised to raise the conveyor chain 21 and agitate containers when the containers are carried on the conveyor chain. Air is supplied to the air cylinder 61 intermittently by valving apparatus (not shown) so that the containers are vibrated up and down while being loaded with beans, and contents of the containers are shaken as the containers are loaded. If desired, a spring 71 (FIG. 1) can be provided in the air cylinder 61 for returning the crank arm to the position shown in FIG. 1.

As already pointed out, water from the water trough 27, carrying beans which have not been retained in one the containers 20, is pumped by the pump 28 (FIG. 2) upwardly through the line 29 to be discharged through an open end 73 into the screen-bottomed tray 30. Water can pass through the bottom 74 (FIG. 4) of the tray 30 into a catch basin 76 (FIG. 2) from which the water is returned to the trough 27 through a line 77 as indicated schematically in FIG. 11. The water reaches the pump 28 through a line 78.

The tray 30 is supported by flexible plates 79 which as shown in FIG. 4, are supported by columns 81. The columns 81, in turn, are mounted on a frame 82 (FIG. 2), which also supports the catch basin 76. The tray 30 carries a vibrating drive mechanism 82 (not shown in detail) which causes the tray 30 to vibrate between the full line position of FIG. 4 and the position shown in dot-dash lines at 30a. As the tray 30 vibrates, the beans 22 which are caught on the screen bottom 74 of the tray 30, progress to the left, as shown in FIG. 4, to be returned to the hopper 34.

As the filled containers pass along to the right as shown in FIG. 1, the containers pass beneath the brush 31. The brush 31 is driven by a motor 84 supported on a pillar 86 which, in turn, is mounted on the conveyor frame 46. Gears (not shown in detail) in a gear box 87 drive a shaft 88 and a pulley 89 mounted thereon. The pulley 89 drives a belt 91 which, in turn, drives a pulley 92 mounted on a shaft 93 which carries the brush 31. The brush levels the contents of each container and sweeps excess beans off the containers to be caught in the trough 27 and recirculated.

As the containers approach the brush 31, the containers are picked up by a screw conveyor 96 which positively advances the containers under the brush 31 and past a contents-compressing arrangement indicated generally at 97. The screw conveyor 96 is driven by a drive chain 98 (FIG. 6) driven by a sprocket 99 mounted on a drive shaft 101. As shown in FIG. 1, the drive shaft 101 is driven by a drive chain 102 driven by a shaft 103. The shaft 103 is driven by gears (not shown) in a gear box 104 (FIG. 9) which, in turn, are driven by a transverse shaft 106. The transverse shaft 106 carries a sprocket 107 which is driven by a chain 108 (FIG. 10) which may be driven by mechanism (not shown) which can receive cans from the machine for closing and further processing thereof. The transverse shaft 106 also carries the sprocket 58b (FIGS. 1 and 9) which drives the conveyor chain 21.

The contents-compressing arrangement 97 (FIG. 1) includes a chain 110 riding on sprockets 111 and 112. Bearings for shafts 113 and 114 for the pulleys 111 and 112, respectively, are supported on said upright pillars 116 and 117, respectively. The chain 109 carries the plugs 32, and the timing of the drive for the chain 109 and the screw conveyor 96 is so arranged that one plug 32 enters the upper portion of each container 20, as shown in FIG. 7, to compress the contents of the container. The chain 109 is driven by a sprocket 118 (FIG. 1) mounted on the shaft 114. A chain 119 drives the sprocket 118. The chain 119 runs on a sprocket 121 mounted on a cross shaft 122. A sprocket 123 mounted on the cross shaft 122 is driven by a drive chain 124. The chain 124 drives a sprocket 126 mounted on a cross shaft 127. Another sprocket 128 mounted on the cross shaft 127 is driven by a drive chain 129. The drive chain 129 runs on a sprocket 130 carried by a cross shaft 131. As shown in FIG. 9, the cross shaft 131 is driven by means of gears 132 and 133 mounted on the shafts 131 and 106, respectively.

From the contents-compressing arrangement 97 (FIG. 1), the containers move to a liquid adding section 134 of the machine. At the section 134 each container passes under a lower course of a flexible screen belt 136. The screen belt is formed of relatively heavy flexible openwork interlinked or meshed rings or the like and rides and rests on the tops of the containers, as shown in FIG. 8. An appropriate liquid, such as a salt solution, enters the containers from the distributing head 23. The salt solution passes through the screen belt 136 into the containers, and the screen belt prevents beans in the containers from rising above the tops thereof as the salt solution is introduced into the containers. The screen belt runs on drums 137 (only one of which is shown). The drums 137 are mounted on a cross shaft 138 and the cross shaft 122. The cross shaft 122 drives the screen belt 136. An upper course of the screen belt 136 is supported by a plate 139 suspended on hangers 141, and the screen belt is sufficiently loosely mounted that the lower course of the screen belt rides on and rests upon the tops of the containers.

When the machine is in operation, beans are introduced through the supply duct 33a (FIG. 4) into the hopper 34 and pass therefrom into the vibrating loading bin 24, from which the beans drop into the containers 20 on the conveyor 21 as shown in FIG. 3. Excess beans are caught in water 26 in the trough 27. In addition, beans which pile up in the containers above the tops thereof are swept from the tops of the containers into the water by the brush 31 (FIG. 1). The water and beans suspended therein are circulated by the pump 28 (which is driven by a motor 143) FIG. 2 through the line 29 to the vibrating screen-bottomed tray 30 which separates the beans from the water, the water being recirculated through the line 77 and the beans moving from the tray 30 back into the hopper 34.

Full containers advance from the brush 31 through the contents-compressing section 97 where the plugs 32 enter the upper ends of the containers to compress the contents thereof. Then the containers pass through the liquid adding section 134 where the lower course of the screen belt 136 lies on upper edges of the containers while salt solution or the like is introduced into the containers through the screen belt 136. From the machine, the containers can then pass to other machinery which closes and further processes the containers.

The machine illustrated in the drawings and described above is subject to structural modifications without departing from the spirit and scope of the appended claims.

Having described our invention, what we claim as new and desire to secure by Letters Patent is:

1. A machine for loading containers with particulate material which comprises a conveyor for carrying the containers, a loading bin for loading the particulate material into containers on the conveyor, a trough beneath the conveyor for catching particulate material which passes the containers, means for directing liquid along said trough to catch and carry particulate material which is caught in the trough, a screen-bottomed tray in the path of the liquid to catch and separate the particulate material from the liquid, means for returning the liquid from the tray to the trough, means for returning the particulate material from the tray to the loading bin, a brush mounted above the trough and adjacent the conveyor for leveling the contents of each container, means for laying an open-work belt on the upper end of each container as the containers advance along the conveyor, and means for introducing liquid into the containers through the open-work belt, the belt holding the particulate material inside the containers.

2. A machine for loading containers with particulate material which comprises a conveyor for carrying the containers, a loading bin for loading the particulate material into containers on the conveyor, a trough beneath the conveyor for catching particulate material which passes the containers, means for directing liquid along said trough to catch and carry particulate material which is caught in the trough, a screen-bottomed tray in the path of the liquid to catch and separate the particulate material from the liquid, means for returning the liquid from the tray to the trough, means for returning the particulate material from the tray to the loading bin, a brush mounted above the trough and adjacent the conveyor for leveling the contents of each container, means for compressing the contents of each container as containers advance beyond the loading bin, means for laying an open-work belt on the upper end of each container as the containers advance along the conveyor, and means for introducing liquid into the containers through the open-work belt, the belt holding the particulate material inside the containers.

3. A machine for loading containers with particulate material which comprises a conveyor for carrying the containers, a loading bin for loading the particulate material into containers on the conveyor, a trough beneath the conveyor for catching particulate material which passes the containers, means for directing liquid along said trough to catch and carry particulate material which is caught in the trough, means for separating the particulate material from the liquid, means for returning the liquid to the trough, and means for returning the particulate material to the loading bin.

4. A machine for loading containers with particulate material which comprises a conveyor for carrying the containers, a loading bin above the conveyor for loading the particulate material into containers on the conveyor, a trough beneath the conveyor for catching particulate material which passes the containers, means for directing liquid along said trough to carry particulate material which is caught in the trough, a screen-bottomed tray in the path of the liquid to catch and separate the particulate material from the liquid, means for returning the liquid from the tray to the trough, and means for returning the particulate material from the tray to the loading bin.

5. A machine for loading open-topped containers which comprises a conveyor carrying the containers, means for loading particulate material in the containers, an elongated flexible open-work belt, means guiding a portion of the belt to rest on tops of the containers as the containers travel along the conveyor, and means for introducing liquid into the containers through the open-work belt, the belt holding the particulate material inside the containers.

6. A machine for loading open-topped containers which comprises a conveyor carrying the containers, means for loading particulate material in the containers, means for leveling the material with tops of the containers, an elongated flexible open-work belt, means guiding a portion of the belt to rest on tops of the containers as the containers travel along the conveyor, and means introducing liquid into the containers through the open-work belt, the belt holding the particulate material inside the containers.

7. A machine for loading containers with particulate material which comprises a conveyor for carrying the containers, a loading bin for loading the particulate material into containers on the conveyor, a trough beneath the conveyor for catching particulate material which passes the containers, means for directing liquid along said trough to catch and carry particulate material which is caught in the trough, means for separating the particulate material from the liquid, and means for returning the particulate material to the loading bin.

References Cited in the file of this patent

UNITED STATES PATENTS

| | | |
|---|---|---|
| 655,545 | Bristol | Aug. 7, 1900 |
| 1,260,636 | Campbell et al. | Mar. 26, 1918 |
| 2,416,039 | Albertoli | Feb. 18, 1947 |
| 2,788,808 | Faulkner | Apr. 16, 1957 |
| 2,989,090 | Wolter et al. | June 20, 1961 |
| 3,107,703 | Smith | Oct. 22, 1963 |